(12) United States Patent
Semitsu et al.

(10) Patent No.: US 11,295,457 B2
(45) Date of Patent: Apr. 5, 2022

(54) TRACKING APPARATUS AND COMPUTER READABLE MEDIUM

(71) Applicant: MITSUBISHI ELECTRIC CORPORATION, Tokyo (JP)

(72) Inventors: Takayuki Semitsu, Tokyo (JP); Takamasa Nakao, Tokyo (JP); Ryo Kikuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/834,502

(22) Filed: Mar. 30, 2020

(65) Prior Publication Data

US 2020/0226767 A1 Jul. 16, 2020

Related U.S. Application Data

(63) Continuation of application No. PCT/JP2018/031573, filed on Aug. 27, 2018.

(30) Foreign Application Priority Data

Nov. 21, 2017 (JP) .............................. JP2017-223641

(51) Int. Cl.
*G06K 9/00* (2006.01)
*G06T 7/246* (2017.01)
*G06T 7/00* (2017.01)

(52) U.S. Cl.
CPC ................ *G06T 7/246* (2017.01); *G06T 7/97* (2017.01); *G06T 2207/10016* (2013.01); *G06T 2207/30242* (2013.01)

(58) Field of Classification Search
CPC . G06T 7/246; G06T 7/97; G06T 2207/10016; G06T 2207/30242;

(Continued)

(56) References Cited

U.S. PATENT DOCUMENTS

2003/0033347 A1* 2/2003 Bolle .................. G06F 16/7834
                                                                                    718/107
2009/0189984 A1* 7/2009 Yamazaki ............... G06T 7/246
                                                                                    348/161

(Continued)

FOREIGN PATENT DOCUMENTS

JP        2008-40781 A     2/2008
JP       2008-250746 A    10/2008

(Continued)

OTHER PUBLICATIONS

Babenko et al., "Visual tracking with online Multiple Instance Learning," IEEE Conference on Computer Vision and Pattern Recognition, Jun. 20-25, 2009, 9 pages.

(Continued)

*Primary Examiner* — Andrew M Moyer
(74) *Attorney, Agent, or Firm* — Birch, Stewart, Kolasch & Birch, LLP

(57) ABSTRACT

An extraction unit (21) treats two or more consecutive frames of a plurality of frames constituting video data as a time-window frame, and extracts a plurality of time-window frames from the video data so as to cause at least one frame to be overlappingly included in adjacent time-window frames. A tracking unit (22) treats each time-window frame as a target time-window frame, and tracks target objects in the target time-window frame to generate a tracking result. An integration unit (23) integrates tracking results generated in individual time-window frames, based on a frame overlappingly included in more than one time-window frame, to generate an integration result.

6 Claims, 14 Drawing Sheets

(58) Field of Classification Search
CPC . G06T 2207/30232; G06T 2207/30196; G06T 7/20; G06T 7/254
See application file for complete search history.

(56) References Cited

U.S. PATENT DOCUMENTS

| | | | |
|---|---|---|---|
| 2010/0150408 A1 | 7/2010 | Ishikawa | |
| 2011/0037861 A1* | 2/2011 | Auberger | H04N 5/23267 |
| | | | 348/208.4 |
| 2014/0161319 A1 | 6/2014 | Miyano | |
| 2016/0162738 A1 | 6/2016 | Miyano et al. | |
| 2019/0034713 A1* | 1/2019 | Fraz | G08B 21/0476 |

FOREIGN PATENT DOCUMENTS

| | | |
|---|---|---|
| JP | 2010-130383 A | 6/2010 |
| JP | 2010-206405 A | 9/2010 |
| JP | 2013-25490 A | 2/2013 |
| JP | 2014-182627 A | 9/2014 |
| JP | 2014-215679 A | 11/2014 |
| JP | 2016-85875 A | 5/2016 |
| WO | WO 2008/078736 A1 | 7/2008 |
| WO | WO 2013/012091 A1 | 1/2013 |
| WO | WO 2015/008432 A1 | 1/2015 |

OTHER PUBLICATIONS

International Search Report for International Application No. PCT/JP2018/031573, dated Oct. 16, 2018, with English translation.
Pirsiavash et al., "Globally-optimal greedy algorithms for tracking a variable number of objects," IEEE Conference on Computer Vision and Pattern Recognition, 2011, 10 pages.

* cited by examiner

TRACKING APPARATUS AND COMPUTER READABLE MEDIUM

CROSS REFERENCE TO RELATED APPLICATIONS

This application is a Continuation of PCT International Application No. PCT/JP2018/031573, filed on Aug. 27, 2018, which claims priority under 35 U.S.C. 119(a) to Patent Application No. 2017-223641, filed in Japan on Nov. 21, 2017, all of which are hereby expressly incorporated by reference into the present application.

TECHNICAL FIELD

The present invention relates to a technique for tracking target objects captured in video data.

BACKGROUND ART

There is a tracking technique for tracking target objects such as persons captured in video data obtained by a camera device such as a surveillance camera. In the tracking technique, correspondences of target objects detected in a plurality of frames constituting the video data are determined between frames, so as to track the target objects.

The tracking technique includes a sequential correspondence-determination method and an overall optimization method.

The sequential correspondence-determination method is a method in which only the most recent tracking result is retained, and when input data on target objects detected in a frame is newly obtained, correspondences are determined in relation to the most recent tracking result so as to update the tracking result. Non-Patent Literature 1 describes the sequential correspondence-determination method.

The overall optimization method is a method in which all pieces of input data are retained, and when input data on target objects detected in a frame is newly obtained, the tracking result is updated by overall optimization. Non-Patent Literature 2 describes the overall optimization method.

CITATION LIST

Non-Patent Literature

[Non-Patent Literature 1] Babenko, Boris, Ming-Hsuan Yang, and Serge Belongie. "Visual tracking with online multiple instance learning." Computer Vision and Pattern Recognition, 2009. CVPR 2009. IEEE Conference on. IEEE, 2009.
[Non-Patent Literature 2] Pirsiavash, Hamed, Deva Ramanan, and Charless C. Fowlkes. "Globally-optimal greedy algorithms for tracking a variable number of objects." Computer Vision and Pattern Recognition (CVPR), 2011 IEEE Conference on. IEEE, 2011.

SUMMARY OF INVENTION

Technical Problem

A problem in the sequential correspondence-determination method is that if an occlusion or a non-detection occurs, tracking is interrupted. Another problem of the sequential correspondence-determination method is that if a correspondence is erroneously determined at a certain time, this error will not be corrected. Although the overall optimization method solves the problems in the sequential correspondence-determination method, a problem of the overall optimization method is that a large amount of memory is used.

It is an object of the prevent invention to solve the problems in the sequential correspondence-determination method and also reduce the usage of memory in comparison with the overall optimization method.

Solution to Problem

A tracking apparatus according to the present invention includes:
an extraction unit to treat two or more consecutive frames of a plurality of frames constituting video data as a time-window frame, and extract a plurality of time-window frames from the video data so as to cause at least one frame to be overlappingly included in adjacent time-window frames;
a tracking unit to treat each of the time-window frames extracted by the extraction unit as a target time-window frame, and track target objects in the target time-window frame to generate a tracking result; and
an integration unit to integrate tracking results generated in individual ones of the time-window frames by the tracking unit, based on a frame overlappingly included in more than one time-window frame, to generate an integration result.

The extraction unit extracts the plurality of time-window frames so as to cause two or more consecutive frames to be overlappingly included in two or more consecutive time-window frames.

Tracking unit generates the tracking result indicating a correspondence, between frames constituting the target time-window frame, of target objects detected in the frames constituting the target time-window frame.

The integration unit integrates the tracking results by counting the number of times a same correspondence is indicated by the tracking results between each pair of frames included in the plurality of frames, and determining a correspondence of the target objects between each pair of frames based on the counted number.

The integration unit treats the number of times the same correspondence is indicated by the tracking results as the number of votes, and determines a correspondence of the target objects between each pair of frames included in the plurality of frames by preferentially adopting a correspondence with the largest number of votes.

The integration unit treats the number of times the same correspondence is indicated by the tracking results as the number of votes, and determines a correspondence of the target objects between each pair of frames included in the plurality of frames by preferentially adopting a correspondence with a share of votes that is largest, the share of votes being obtained by dividing the number of votes by the number of times the correspondence concerned has a possibility of being selected.

The tracking unit generates the tracking result indicating a correspondence, between frames constituting the target time-window frame, of target objects detected in the frames constituting the target time-window frame.

The integration unit integrates the tracking results by at least partially connecting correspondences indicated by the tracking results on a basis of a target object detected in a base frame among frames overlappingly included in more than one time-window frame.

The integration unit treats a center frame among the frames overlappingly included in more than one time-window frame as the base frame.

The extraction unit extracts the time-window frames each including a base number of consecutive frames, each of the time-window frames being successively shifted by one frame.

A tracking program according to the present invention causes a computer to execute:

an extraction process to treat two or more consecutive frames of a plurality of frames constituting video data as a time-window frame, and extract a plurality of time-window frames from the video data so as to cause at least one frame to be overlappingly included in adjacent time-window frames;

an object tracking process to treat each of the time-window frames extracted by the extraction process as a target time-window frame, and track target objects in the target time-window frame to generate a tracking result; and a result integration process to integrate tracking results generated in individual ones of the time-window frames by the object tracking process, based on a frame overlappingly included in more than one time-window frame, to generate an integration result.

Advantageous Effects of Invention

In the present invention, tracking results are generated for individual time-window frames, and the tracking results are integrated to generate an integration result. As a result, the problems in the sequential correspondence-determination method can be solved, and the usage of memory can also be reduced in comparison with the overall optimization method.

DESCRIPTION OF EMBODIMENTS

First Embodiment

\*\*\*Description of Configuration\*\*\*

Figure 1:
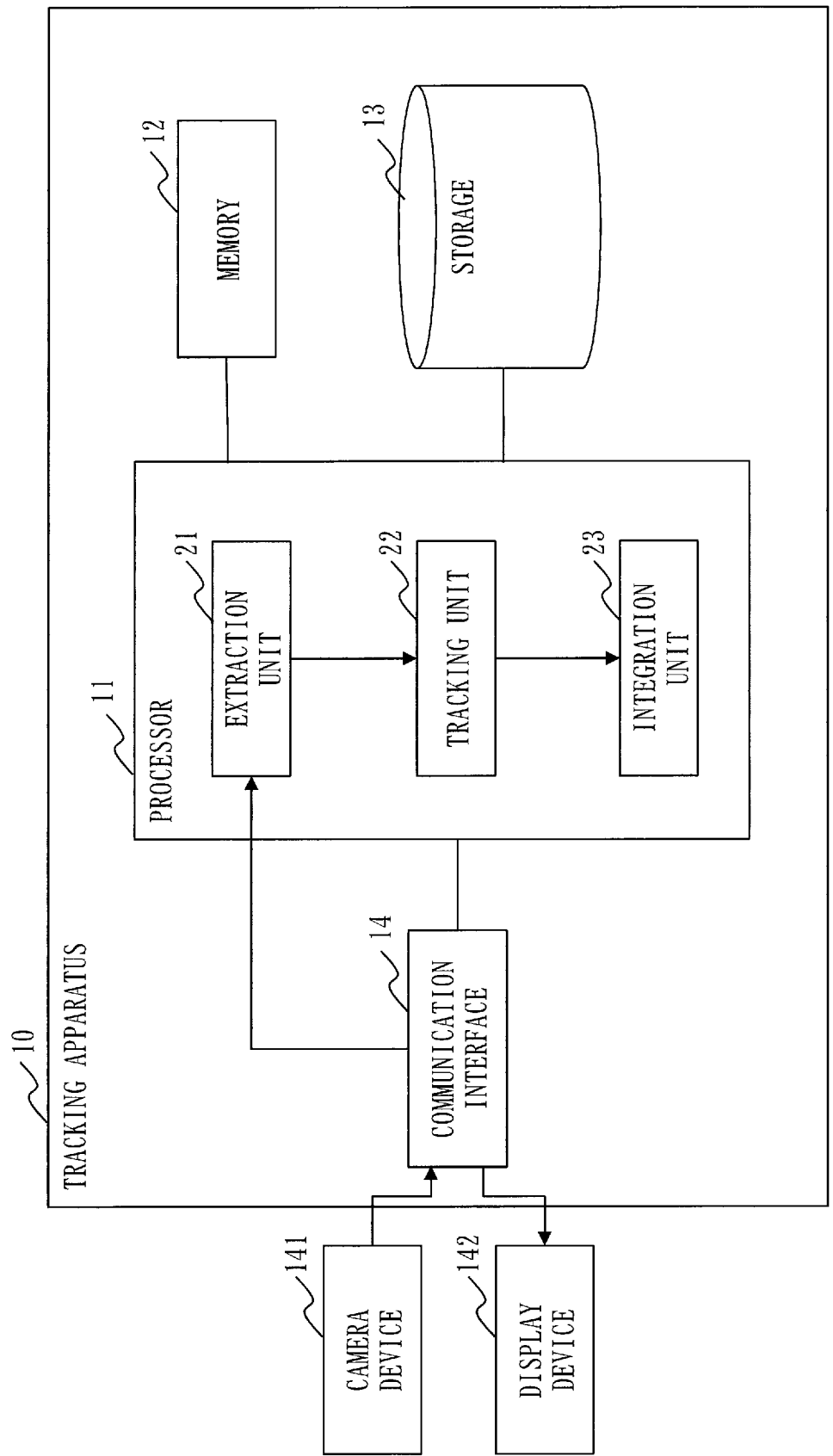
FIG. 1 is a configuration diagram of a tracking apparatus 10 according to a first embodiment.

A configuration of a tracking apparatus 10 according to a first embodiment will be described with reference to FIG. 1.

The tracking apparatus 10 includes hardware of a processor 11, a memory 12, a storage 13, and a communication interface 14. The processor 11 is connected with other hardware components via signal lines and controls these other hardware components.

The processor 11 is an integrated circuit (IC) that performs processing. As a specific example, the processor 11 is a central processing unit (CPU), a digital signal processor (DSP), or a graphics processing unit (GPU).

The memory 12 is a storage device to temporarily store data. As a specific example, the memory 12 is a static random access memory (SRAM) or a dynamic random access memory (DRAM).

The storage 13 is a storage device to store data. As a specific example, the storage 13 is a hard disk drive (HDD). Alternatively, the storage 13 may be a portable recording medium, such as a Secure Digital (SD, registered trademark) memory card, CompactFlash (CF, registered trademark), a NAND flash, a flexible disk, an optical disc, a compact disc, a Blu-ray (registered trademark) disc, or a digital versatile disc (DVD).

The communication interface 14 is an interface for communicating with an external device. As a specific example, the communication interface 14 is an Ethernet (registered trademark) port, a Universal Serial Bus (USB, registered trademark) port, or a High-Definition Multimedia Interface (HDMI, registered trademark) port.

The tracking apparatus 10 is connected with a camera device 141 and a display device 142 via the communication interface 14.

The tracking apparatus 10 includes, as functional components, an extraction unit 21, a tracking unit 22, and an integration unit 23. The functions of the functional components of the tracking apparatus 10 are realized by software.

The storage 13 stores programs for realizing the functions of the functional components of the tracking apparatus 10. These programs are loaded by the processor 11 into the memory 12 and executed by the processor 11. This realizes the functions of the functional components of the tracking apparatus 10.

FIG. 1 illustrates only one processor 11. However, a plurality of processors 11 may be included, and the plurality of processors 11 may cooperate to execute the programs for realizing the functions.

\*\*\*Description of Operation\*\*\*

Operation of the tracking apparatus 10 according to the first embodiment will be described with reference to FIGS. 2 to 7.

The operation of the tracking apparatus 10 according to the first embodiment corresponds to a tracking method according to the first embodiment. The operation of the tracking apparatus 10 according to the first embodiment also corresponds to processes of a tracking program according to the first embodiment.

An overall process of the tracking apparatus 10 according to the first embodiment will be described with reference to FIG. 2.

Figure 2:
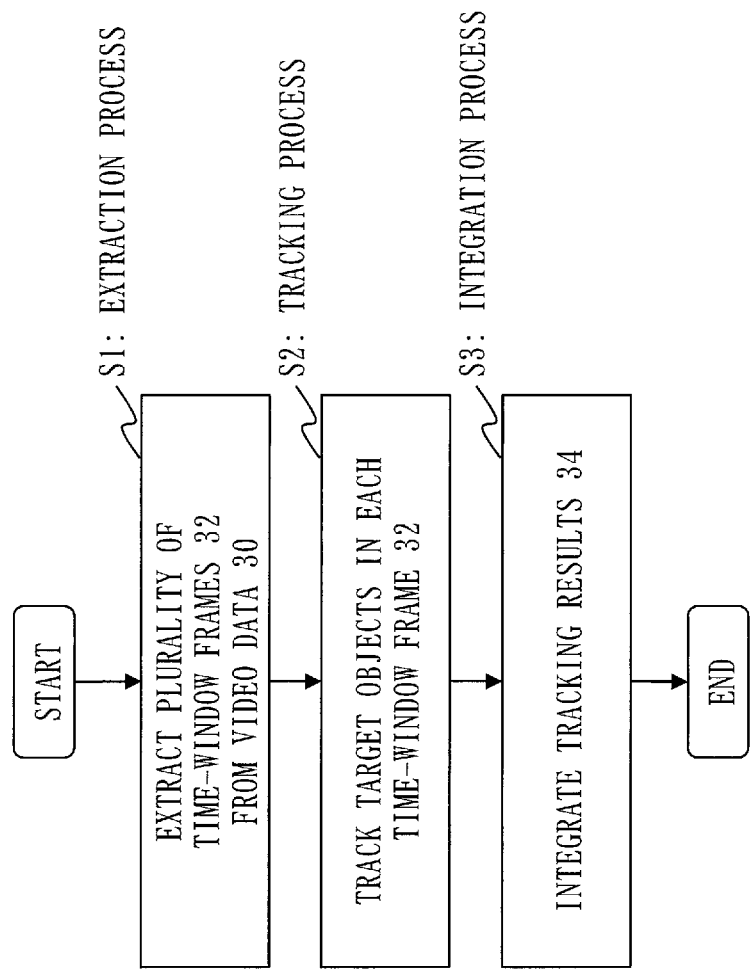
FIG. 2 is a flowchart of an overall process of the tracking apparatus 10 according to the first embodiment.

(Step S1 of FIG. 2: Extraction Process)

The extraction unit 21 acquires video data 30 from the camera device 141 via the communication interface 14. The extraction unit 21 treats two or more consecutive frames 31 of a plurality of frames 31 constituting the video data 30 as a time-window frame 32, and extracts a plurality of time-window frames 32 from the video data 30. At this time, the extraction unit 21 extracts a plurality of time-window frames 32 from the video data 30 so as to cause at least one frame 31 to be overlappingly included in adjacent time-window frames 32. Then, the extraction unit 21 writes the extracted time-window frames 32 into the memory 12.

In the first embodiment, the extraction unit 21 extracts a plurality of time-window frames 32 so as to cause every set of two or more consecutive frames 31, in which tracking is to be performed, to be overlappingly included in two or more consecutive time-window frames 32.

This will be specifically described with reference to FIG. 3.

Figure 3:
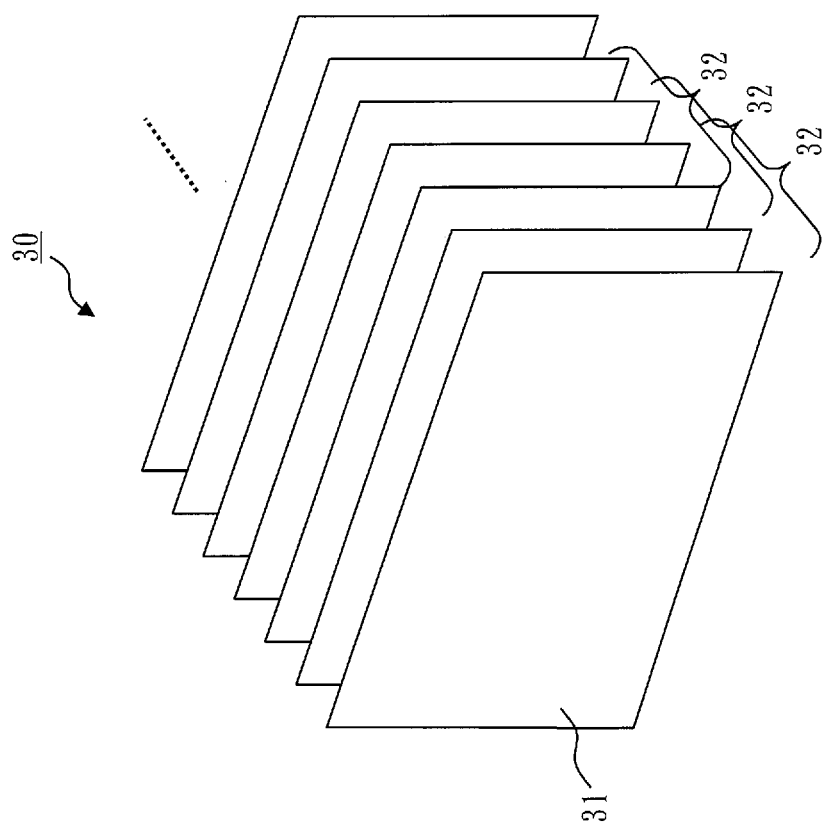
FIG. 3 is a diagram describing time-window frames 32 according to the first embodiment.

In FIG. 3, the extraction unit 21 treats four consecutive frames 31 as one time-window frame 32. The extraction unit 21 extracts a plurality of time-window frames 32 such that each of them is successively shifted by one frame 31. As a result, three frames 31 are overlappingly included in adjacent time-window frames 32.

(Step S2 of FIG. 2: Tracking Process)

The tracking unit 22 treats each time-window frame 32 extracted in step S1 as a target time-window frame 32, and tracks target objects 33 such as persons in the target time-window frame 32 to generate a tracking result 34. A target object 33 is not limited to a person and may be an object such as a bag.

Specifically, the tracking unit 22 retrieves the target time-window frame 32 from the memory 12. The tracking unit 22 generates the tracking result 34 indicating correspondences, between the frames 31 constituting the target time-window frame 32, of the target objects 33 detected in the frames 31 constituting the target time-window frame 32. For example, the tracking unit 22 generates the tracking result 34 by the algorithm of an existing overall optimization method, using, as input, information on the target objects 33 detected in the frames 31 constituting the target time-window frame 32. As the algorithm of the existing overall optimization method, the algorithm described in Non-Patent Literature 2 may be used. The tracking unit 22 writes the generated tracking result 34 into the memory 12.

Figure 4:
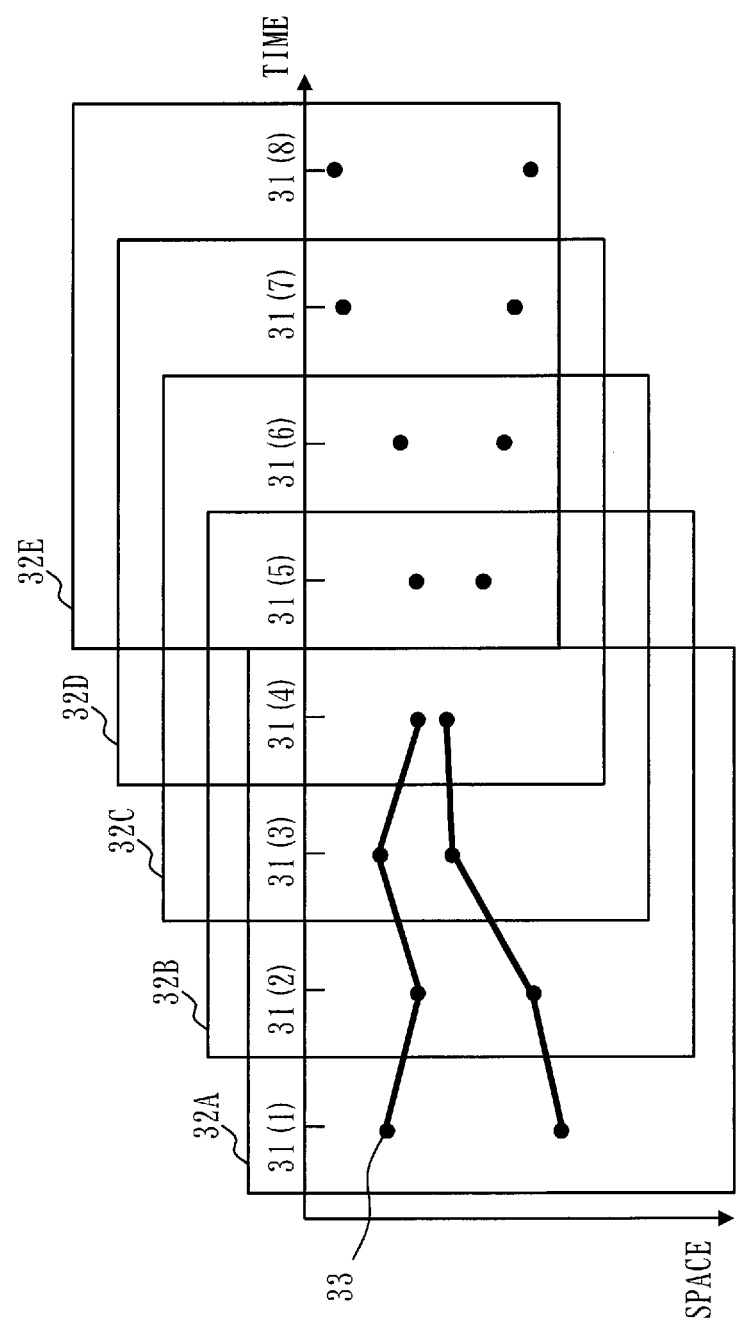
FIG. 4 is a diagram describing a tracking process according to the first embodiment.

This will be specifically described with reference to FIG. 4. In FIG. 4, the horizontal axis represents time, and the vertical axis represents space. In FIG. 4, the target objects 33 detected in each frame 31 are arranged along the horizontal axis, and each position in the direction of the vertical axis indicates the position of each target object 33.

The tracking unit 22 tracks the target objects 33 in each target time-window frame 32, such as a time-window frame 32A, a time-window frame 32B, and a time-window frame 32C. At this time, the tracking unit 22 uses, as input, information on the target objects 33 detected in the frames 31 constituting the target time-window frame 32. For example, when the time-window frame 32A is the target time-window frame 32, the target objects 33 detected in a frame 31(1), the target objects 33 detected in a frame 31(2), the target objects 33 detected in a frame 31(3), and the target objects 33 detected in a frame 31(4) are used as input.

Then, the tracking unit 22 determines correspondences, between the frames 31 constituting the target time-window frame 32, of the target objects 33 detected in the frames 31 constituting the target time-window frame 32, using the algorithm of the existing overall optimization method. In FIG. 4, an edge is drawn between each pair of nodes representing the target objects 33 that are tracked and determined as corresponding to each other in the time-window frame 32A. In this way, the tracking result 34 is obtained for each time-window frame 32.

(Step S3 of FIG. 2: Integration Process)

The integration unit 23 retrieves from the memory 12 the tracking results 34 generated in the individual time-window frames 32 in step S2. The integration unit 23 integrates the retrieved tracking results 34 to generate an integration result 35. At this time, the integration unit 23 integrates the tracking results 34 based on a frame 31 overlappingly included in more than one time-window frame 32. Then, the integration unit 23 outputs the generated integration result 35 to the display device 142 via the communication interface 14.

Specifically, the integration unit 23 counts the number of times the same correspondence is indicated by the tracking results 34 between each pair of frames 31 included in the plurality of frames 31 constituting the video data 30. Based on the counted numbers, the integration unit 23 determines correspondences of the target objects 33 between each pair of frames 31. As a result of this, the tracking results 34 are integrated.

Figure 5:
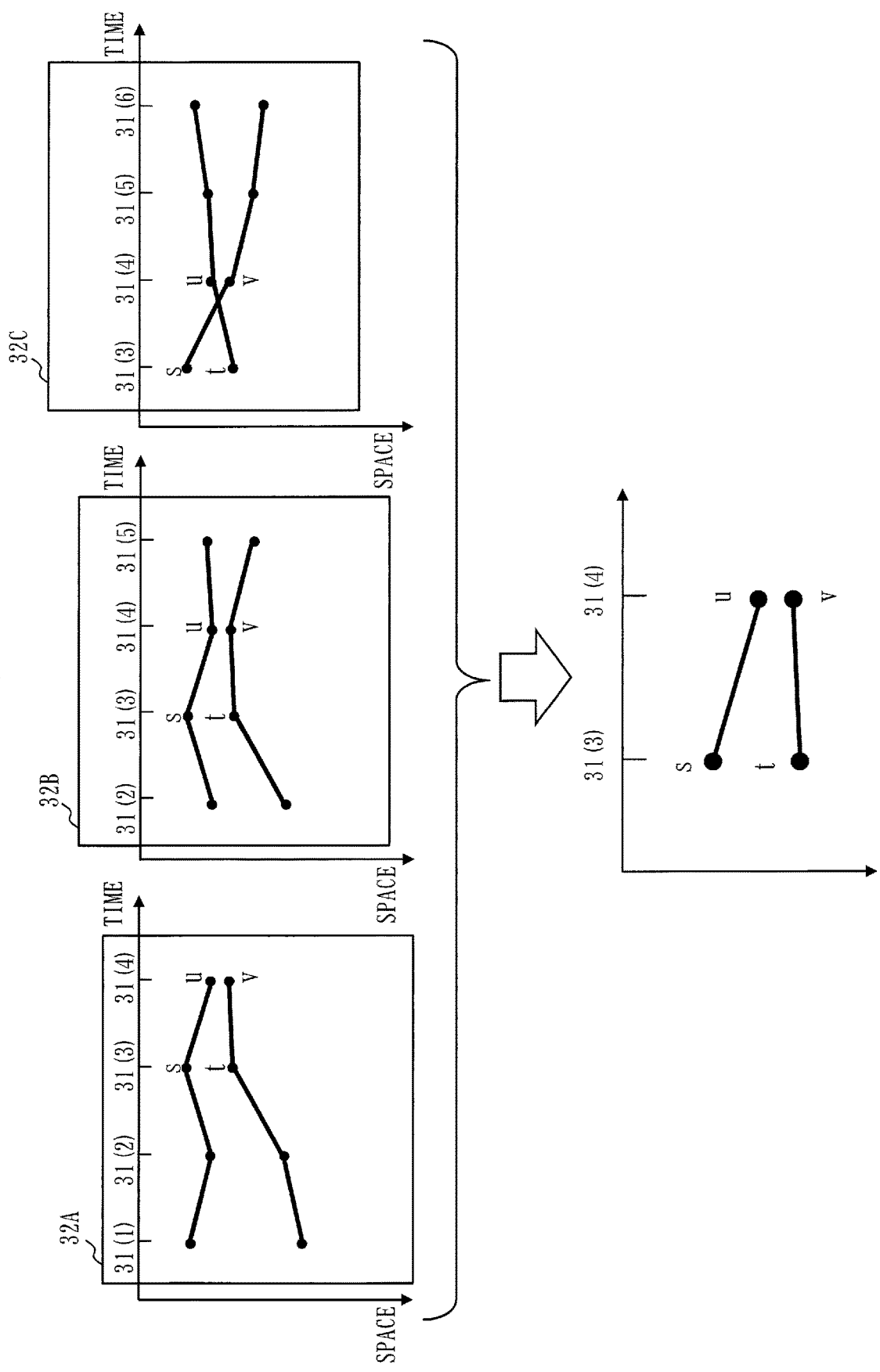
FIG. 5 is a diagram describing an integration process according to the first embodiment.

This will be specifically described with reference to FIG. 5.

The integration unit 23 treats the number of times the same correspondence is indicated by the tracking results 34 as the number of votes, and adopts a correspondence with the largest number of votes preferentially. In this way, the integration unit 23 determines correspondences of the target objects 33 between each pair of frames 31 included in the plurality of frames 31 constituting the video data 30.

For example, the correspondences of the target objects 33 in the frame 31(3) and the target objects 33 in the frame 31(4) are indicated by a tracking result 34A generated in the time-window frame 32A, a tracking result 34B generated in the time-window frame 32B, and a tracking result 34C generated in the time-window frame 32C. Accordingly, the integration unit 23 refers to the tracking result 34A, the tracking result 34B, and the tracking result 34C and adopts a correspondence with the largest number of votes preferentially.

As a specific example, with respect to a target object 33$s$ and a target object 33$t$ in the frame 31(3) and a target object 33$u$ and a target object 33$v$ in the frame 31(4), the correspondence between the target object 33$s$ and the target object 33$u$ is indicated twice, the correspondence between the target object 33$s$ and the target object 33$v$ is indicated once, the correspondence between the target object 33$t$ and the target object 33$u$ is indicated once, and the correspondence between the target object 33$t$ and the target object 33$v$ is indicated twice. Accordingly, the integration unit 23 adopts the correspondence between the target object 33$s$ and the target object 33$u$ and the correspondence between the target object 33$t$ and the target object 33$v$, which are the correspondences with the largest number of votes. This decides the correspondences of the target object 33$s$ and the target object 33$t$ in the frame 31(3) and the target object 33$u$ and the target object 33$v$ in the frame 31(4).

The integration process according to the first embodiment (step S3 of FIG. 2) will be described with reference to FIG. 6.

Figure 6:
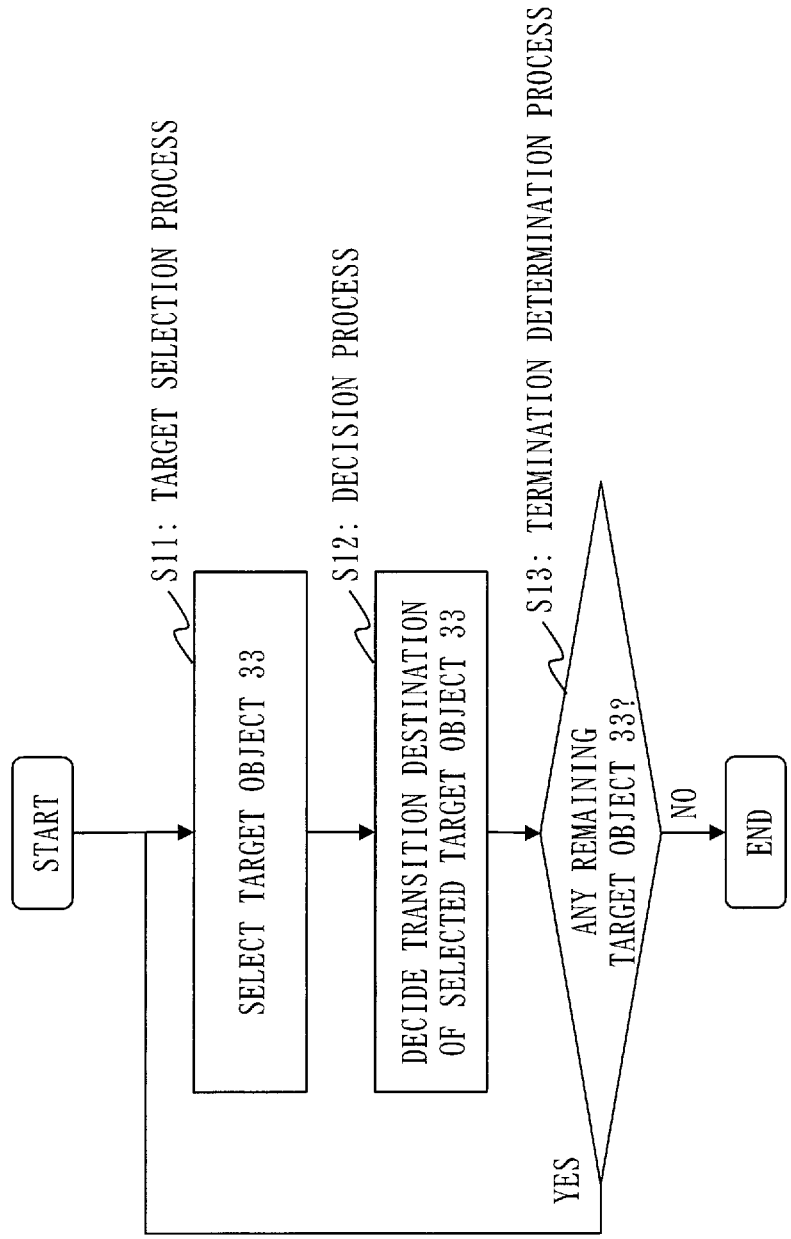
FIG. 6 is a flowchart of the integration process according to the first embodiment.

(Step S11 of FIG. 6: Target Selection Process)

The integration unit 23 selects a target object 33 for which a transition destination has not been decided and for which there is a transition destination candidate.

Figure 7:
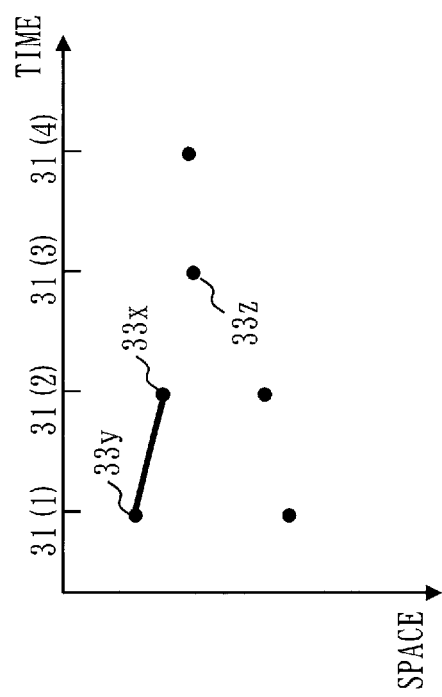
FIG. 7 is a diagram describing a transition destination according to the first embodiment.

That a transition destination has not been decided means that a correspondence to a target object 33 detected in a frame 31 later in time has not been determined. For example, as illustrated in FIG. 7, a target object 33x in the frame 31(2) has been determined as corresponding to a target object 33y in the frame 31(1) earlier in time than the frame 31(2). However, the target object 33x has not been determined as corresponding to any of the target objects 33 in the frame 31(3) or the frame 31(4) later in time than the frame 31(2). Therefore, the target object 33x is a target object 33 for which a transition destination has not been decided.

That there is a transition destination candidate means that a correspondence to one of the target objects 33 detected in a frame 31 later in time is indicated in one of the tracking results 34 generated in step S2 of FIG. 2. For example, assume that in the tracking result 34 of the time-window frame 32A, the target object 33x in the frame 31(2) is connected with a target object 33z in the frame 31(3) later in time than the frame 31(2). In this case, the target object 33x is a target object 33 for which there is a transition destination candidate.

(Step S12 of FIG. 6: Decision Process)

The integration unit 23 decides the transition destination of the target object 33 selected in step S11.

Specifically, the integration unit 23 identifies the transition destination candidate for the selected target object 33 in each of the tracking results 34 generated in step S2 of FIG. 2. For each identified transition destination candidate, the integration unit 23 counts the number of tracking results 34 in which the identified transition destination candidate concerned is indicated as the transition destination. The number counted here is the number of votes. The integration unit 23 decides that the transition destination candidate with the largest number of votes is the transition destination of the selected target object 33.

Note that if there are two or more transition destination candidates with the same number of votes, one of the transition destination candidates may be selected according to any predetermined rule.

(Step S13 of FIG. 6: Termination Determination Process)

The integration unit 23 determines where there remains a target object 33 for which a transition destination has not been decided and for which there is a transition destination candidate.

If there remains such a target object 33, the integration unit 23 returns the process to step S11. If there remains no such target object 33, the integration unit 23 terminates the process.

Note that in the method described above, the frame 31 at the beginning of the video data 30, for example, is included in only one time-window frame 32. For such a frame 31 included exceptionally in only one time-window frame 32, correspondences in the one time-window frame 32 may be adopted.

*Effects of First Embodiment*

As described above, the tracking apparatus 10 according to the first embodiment generates the tracking results 34 for the individual time-window frames 32, and integrates the tracking results 34 to generate the integration result 35.

As a result, the problems in the sequential correspondence-determination method are solved in the tracking result 34 of each time-window frame 32. Performing processing on each time-window frame 32 can reduce the usage of the memory 12 in comparison with performing processing on the entire video data 30.

In addition, the tracking apparatus 10 according to the first embodiment determines a correspondence based on the number of votes obtained from the tracking results 34 of the individual time-window frames 32. As a result, the appropriate integration result 35 for the video data 30 as a whole can be obtained.

*Other Configurations*

<First Variation>

In the first embodiment, the integration unit 23 adopts a correspondence with the largest number of votes preferentially in step S3 of FIG. 2. However, in step S3 of FIG. 2, the integration unit 23 may adopt a correspondence with the largest share of votes preferentially, instead of a correspondence with the largest number of votes. The share of votes is a value obtained by dividing the number of votes by the number of voting opportunities. The number of voting opportunities is the number of times a correspondence has a possibility of being selected.

Figure 8:
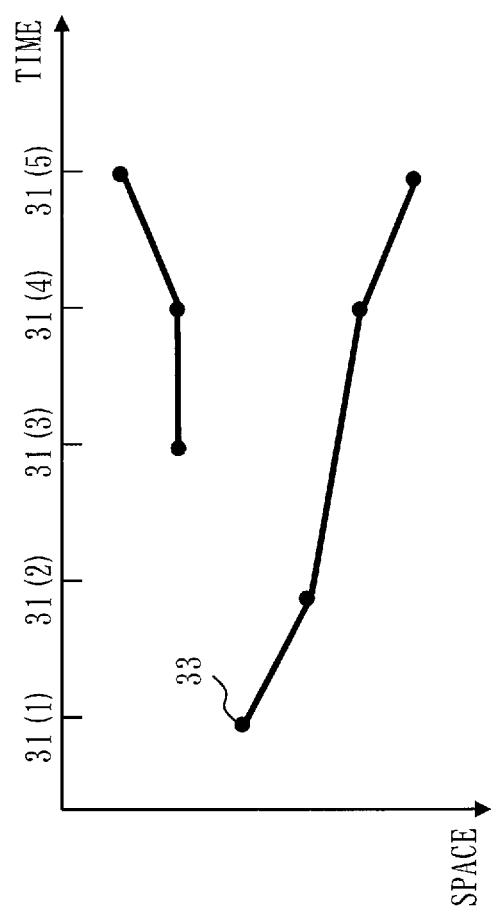
FIG. 8 is a diagram describing an integration process according to a first variation.

As illustrated in FIG. 8, there may be a case where target objects 33 that are not in adjacent frames 31 are indicated as corresponding to each other in a tracking result 34. In FIG. 8, a target object 33 in the frame 31(2) and a target object 33 in the frame 31(4) are indicated as corresponding to each other. That is, there may be a case where a target object 33 detected in a given frame 31 is indicated as corresponding not to a target object 33 detected in the next frame 31, but to a target object 33 detected in a later frame 31 separated by one or more intervening frames.

The number of time-window frames 32 in which three consecutive frames 31 are overlappingly included is smaller than the number of time-window frames 32 in which two consecutive frames 31 are overlappingly included. For example, assume that four consecutive frames 31 are treated as one time-window frame 32, and the time-window frames 32 are extracted such that each of them is successively shifted by one frame 31, as illustrated in FIG. 3. In this case, two consecutive frames 31 are overlappingly included in three time-window frames 32, whereas three or more consecutive frames 31 are overlappingly included in two time-window frames 32.

For this reason, if the number of votes when target objects 33 not in adjacent frames 31 are indicated as corresponding to each other is compared with the number of votes when target objects 33 in adjacent frames 31 are indicated as corresponding to each other, an appropriate result may not be obtained. Therefore, a correspondence is determined using the share of votes, in place of the number of votes.

In the example illustrated in FIG. 3, the share of votes when a target object 33 is indicated as corresponding to a target object 33 in an adjacent frame 31 is a value obtained by dividing the number of votes by three. This "three" is the number of voting opportunities and the number of time-window frames 32 in which two consecutive frames 31 are overlappingly included. Similarly, the share of votes when a target object 33 is indicated as corresponding to a target object 33 in a frame 31 separated by one intervening frame is a value obtained by dividing the number of votes by two. This "two" is the number of voting opportunities and the number of time-window frames 32 in which three consecutive frames 31 are overlappingly included.

<Second Variation>

In the first embodiment, the extraction unit 21 extracts a plurality of time-window frames 32 from the video data 30 at a time in step S1 of FIG. 2. However, the extraction unit 21 may extract a new time-window frame 32 each time a base number of new frames 31 are obtained. In this case, when a new time-window frame 32 is extracted, the processes in step S2 and the subsequent step of FIG. 2 may be performed using the extracted time-window frame 32.

In the example illustrated in FIG. 3, when a new frame 31 is obtained, a new time-window frame 32 can be extracted. Accordingly, the extraction unit 21 may extract a new time-window frame 32 each time a new frame 31 is obtained. As a matter of course, the extraction unit 21 may extract a new time-window frame 32 each time a given number, which is at least two, of frames 31 are obtained, instead of extracting a time-window frame 32 each time a frame 31 is obtained.

In this case, a frame 31 related only to time-window frames 32 already used in the generation of tracking results 34 may be deleted from the memory 12. For example, in the example illustrated in FIG. 4, once the tracking result 34 of the time-window frame 32A has been generated, the frame 31(1) may be deleted from the memory 12.

A tracking result 34 not used in the generation of an integration result 35 may also be deleted from the memory 12. For example, in the example illustrated in FIG. 4, once correspondences have been determined in the frame 31(3) and the frame 31(4), the tracking result 34 of the time-window frame 32A is no longer used. Therefore, the tracking result 34 of the time-window frame 32A may be deleted from the memory 12.

This can reduce the usage of the memory 12.

<Third Variation>

In the first embodiment, a plurality of time-window frames 32 are extracted so as to cause every set of frames 31 to be overlappingly included in two or more time-window frames 32. However, considering that a decision is to be made based on a majority vote, it is desirable to extract a plurality of time-window frames 32 so as to cause every set of frames 31 to be overlappingly included in three or more time-window frames 32.

Tracking accuracy can be improved by arranging that every set of frames 31 is overlappingly included in as many time-window frames 32 as possible. However, the usage of the memory 12 increases in proportion to an increase in the number of time-window frames 32 in which every set of frames 31 is to be overlappingly included.

In addition, when a new time-window frame 32 is extracted each time a new frame 31 is obtained, as described in the second variation, increasing the number of frames 31 included in one time-window frame 32 slows down the obtainment of a result.

<Fourth Variation>

In the first embodiment, the functional components are realized by software. As a fourth variation, however, the functional components may be realized by hardware. With respect to the fourth variation, differences from the first embodiment will be described.

Figure 9:
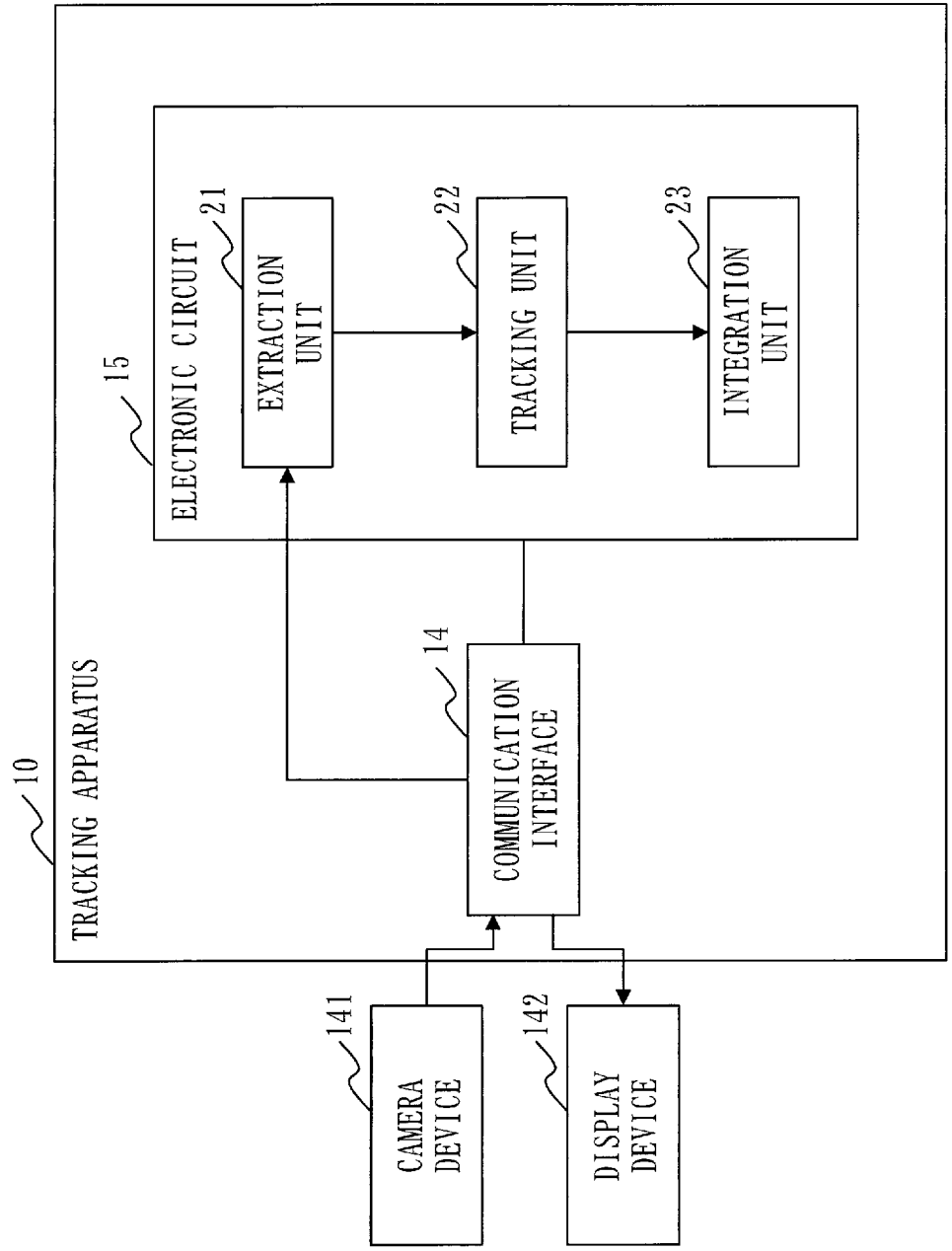
FIG. 9 is a configuration diagram of the tracking apparatus 10 according to a fourth variation.

A configuration of the tracking apparatus 10 according to the fourth variation will be described with reference to FIG. 9.

When the functional components are realized by hardware, the tracking apparatus 10 includes an electronic circuit 15, in place of the processor 11, the memory 12, and the storage 13. The electronic circuit 15 is a dedicated circuit that realizes the functions of the functional components, the memory 12, and the storage 13.

The electronic circuit 15 is assumed to be a single circuit, a composite circuit, a programmed processor, a parallel-programmed processor, a logic IC, a gate array (GA), an application-specific integrated circuit (ASIC), or a field-programmable gate array (FPGA).

The functional components may be realized by one electronic circuit 15, or the functional components may be distributed among and realized by a plurality of electronic circuits 15.

<Fifth Variation>

As a fifth variation, some of the functional components may be realized by hardware, and the rest of the functional components may be realized by software.

Each of the processor 11, the memory 12, the storage 13, and the electronic circuit 15 is referred to as processing circuitry. That is, the functions of the functional components are realized by the processing circuitry.

Second Embodiment

A second embodiment differs from the first embodiment in a method for integrating tracking results 34. In the second embodiment, this difference will be described, and description of the same portions will be omitted.

*Description of Operation*

Operation of the tracking apparatus 10 according to the second embodiment will be described with reference to FIGS. 2, 10, and 11.

The operation of the tracking apparatus 10 according to the second embodiment corresponds to the tracking method according to the second embodiment. The operation of the tracking apparatus 10 according to the second embodiment also corresponds to processes of the tracking program according to the second embodiment.

An overall process of the tracking apparatus 10 according to the second embodiment will be described with reference to FIG. 2.

Processes in step S1 to step S2 are the same as those of the first embodiment.

(Step S3 of FIG. 2: Integration Process)

The integration unit 23 integrates the tracking results 34 by at least partially connecting correspondences indicated by the tracking results 34 on a basis of target objects detected in a base frame 36 among frames 31 overlappingly included in more than one time-window frame 32.

This will be specifically described with reference to FIG. 10.

Figure 10:
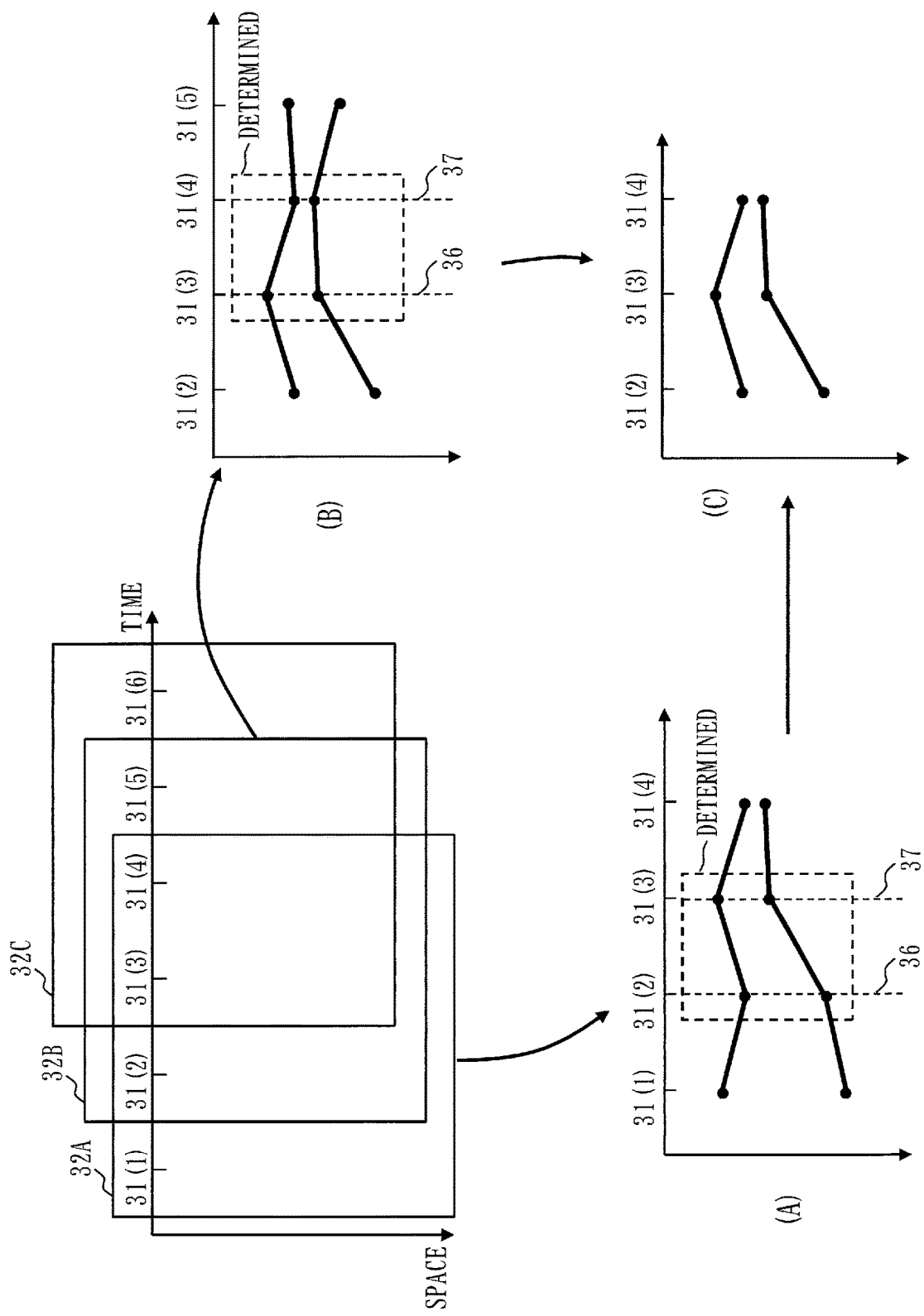
FIG. 10 is a diagram describing an integration process according to a second embodiment.

In FIG. 10, it is assumed that four consecutive frames 31 are treated as one time-window frame 32, and a plurality of time-window frames 32 are extracted such that each of them is successively shifted by one frame 31, as in the example illustrated in FIG. 3.

The integration unit 23 treats a frame 31 at a specified position that is included overlappingly in the target time-window frame 32 and the time-window frame 32 immediately preceding the target time-window frame 32 as the base frame 36. The integration unit 23 treats the frame 31 immediately following the base frame 36 in the target time-window frame 32 as a specified frame 37. The integration unit 23 adopts correspondences in the base frame 36 and the specified frame 37 in the target time-window frame 32 as correspondences in the base frame 36 and the specified frame 37 in an integration result 35.

For example, as illustrated in (A) of FIG. 10, the time-window frame 32A is assumed to be the target time-window frame 32. The second earliest frame 31 in the time-window frame 32 is assumed to be the base frame 36. In this case, the frame 31(2) is the base frame 36. Accordingly, the frame 31(3) immediately following the frame 31(2) is the specified frame 37. Therefore, correspondences in the frame 31(2) and the frame 31(3) in the time-window frame 32A are adopted as correspondences in the frame 31(2) and the frame 31(3) in the integration result 35.

Next, as illustrated in (B) of FIG. 10, the time-window frame 32B is assumed to be the target time-window frame 32. In this case, the frame 31(3) is the base frame 36. Accordingly, the frame 31(4) immediately following the frame 31(3) is the specified frame 37. Therefore, correspondences in the frame 31(3) and the frame 31(4) in the time-window frame 32B are adopted as correspondences in the frame 31(3) and the frame 31(4) in the integration result 35.

As a result, as illustrated in (C) of FIG. 10, correspondences in the frame 31(2) through the frame 31(4) in the integration result 35 are obtained. That is, the tracking result 34 of the target time-window frame 32 and the tracking result 34 of the immediately preceding time-window frame 32 are connected on a basis of the target objects detected in the base frame 36.

The integration process according to the second embodiment (step S3 of FIG. 2) will be described with reference to FIG. 11.

Figure 11:
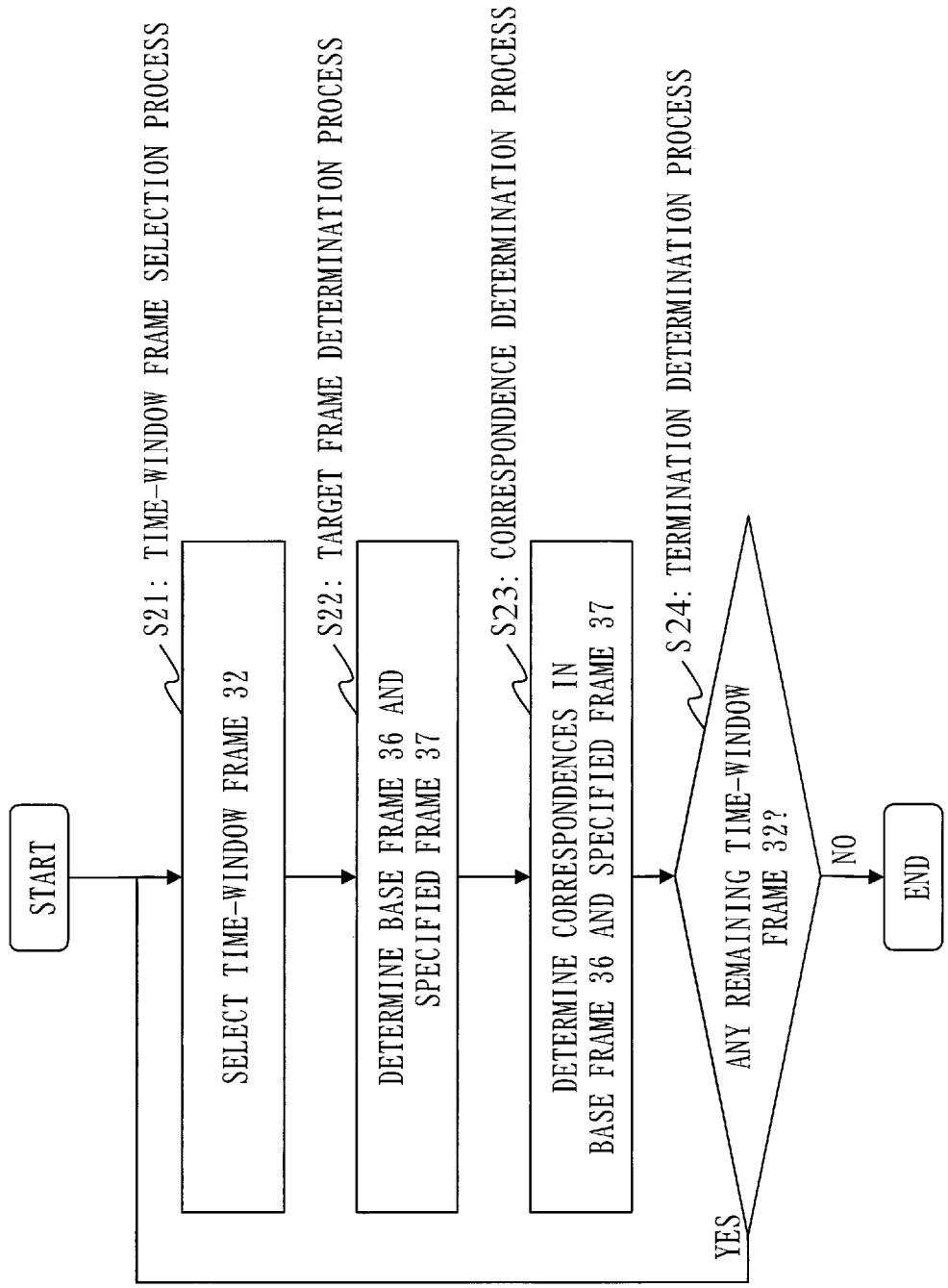
FIG. 11 is a flowchart of the integration process according to the second embodiment.

(Step S21 of FIG. 11: Time-Window Frame Selection Process)

The integration unit 23 selects, as the target time-window frame 32, a time-window frame 32 not previously selected as the target. For example, the integration unit 23 may select each time-window frame 32 as the target time-window frame 32 sequentially in time from the earliest time-window frame 32.

(Step S22 of FIG. 11: Target Frame Determination Process)

The integration unit 23 determines the base frame 36 in the target time-window frame 32 selected in step S21. It is assumed that the position of the base frame 36 is predetermined. For example, the base frame 36 is the frame 31 at the center of the time-window frame 32. If an even number of frames 31 are included in the time-window frame 32, there are two center frames 31, so that the base frame 36 may be either one of these two frames 31.

The integration unit 23 determines that the frame 31 following the base frame 36 is the specified frame 37.

(Step S23 of FIG. 11: Correspondence Determination Process)

The integration unit 23 determines that correspondences in the base frame 36 and the specified frame 37 in the target time-window frame 32 selected in step S21 are correspondences in the base frame 36 and the specified frame 37 in the integration result 35.

(Step S24 of FIG. 11: Termination Determination Process)

The integration unit 23 determines whether there remains a time-window frame 32 that has not been previously selected as the target.

If there remains such a time-window frame 32, the integration unit 23 returns the process to step S21. If there remains no such time-window frame 32, the integration unit 23 terminates the process.

*Effects of Second Embodiment*

As described above, the tracking apparatus 10 according to the second embodiment integrates the tracking results 34 by at least partially connecting correspondences indicated by the tracking results 34 on a basis of the target objects detected in the base frame 36 among the frames 31 overlappingly included in more than one time-window frame 32.

As a result, the tracking results 34 can be integrated with a smaller amount of calculation than that in the first embodiment.

*Other Configurations*
<Sixth Variation>

In the second embodiment, it is assumed that a plurality of time-window frames 32 are extracted such that each of them is successively shifted by one frame 31, as in the example illustrated in FIG. 3. However, a plurality of time-window frames 32 may be extracted such that each of them is successively shifted by a plurality of frames 31. More precisely, it is sufficient that at least one frame 31 is overlappingly included in adjacent time-window frames 32.

Figure 12:
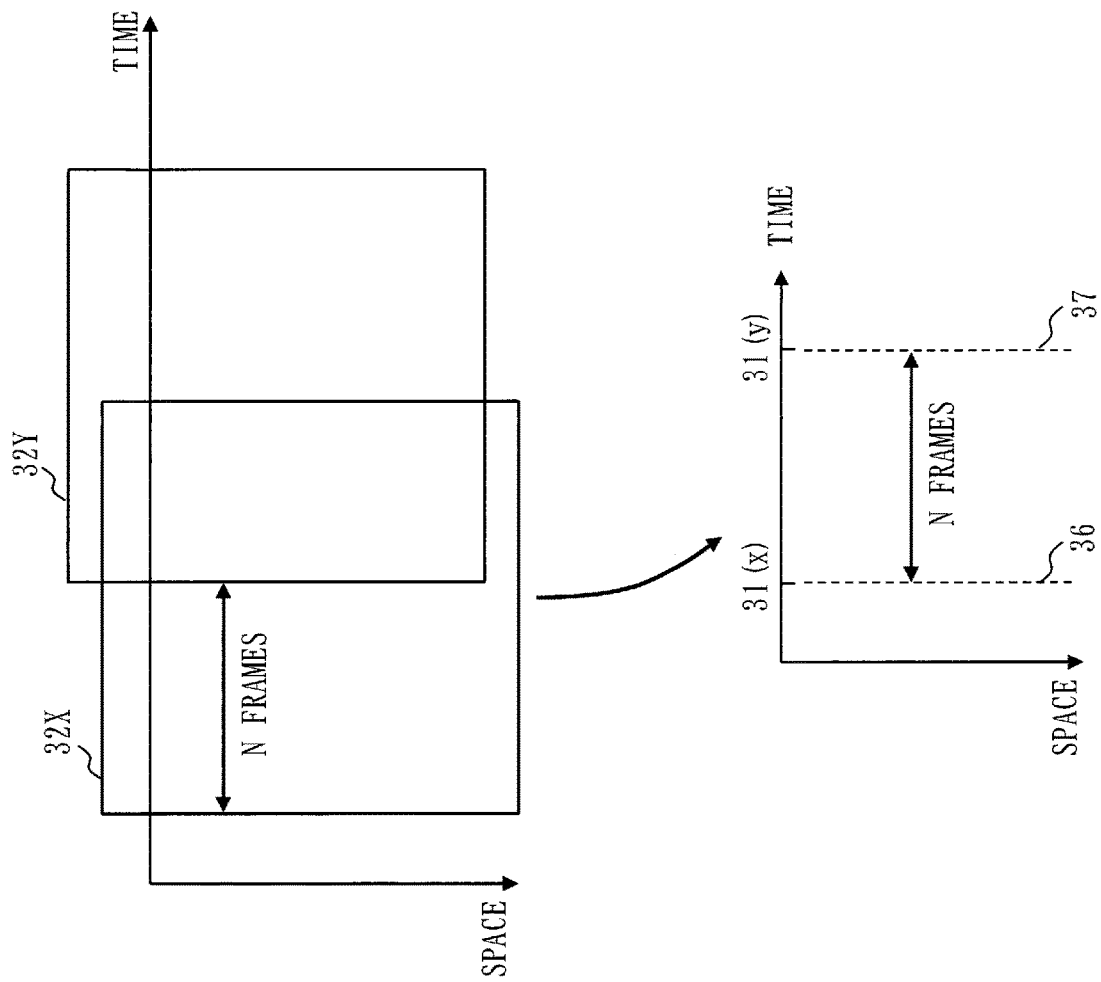
FIG. 12 is a diagram describing time-window frames 32 according to a sixth variation.

Assume that a plurality of time-window frames 32 are extracted such that each of them is successively shifted by N frames 31, as illustrated in FIG. 12, where N is an integer of two or more. In this case, the integration unit 23 treats the Nth frame 31 after the base frame 36 in the target time-window frame 32 as the specified frame 37. The integration unit 23 adopts correspondences in the base frame 36 through the specified frame 37 in the target time-window frame 32 as correspondences in the base frame 36 through the specified frame 37 in the integration result 35.

Figure 13:
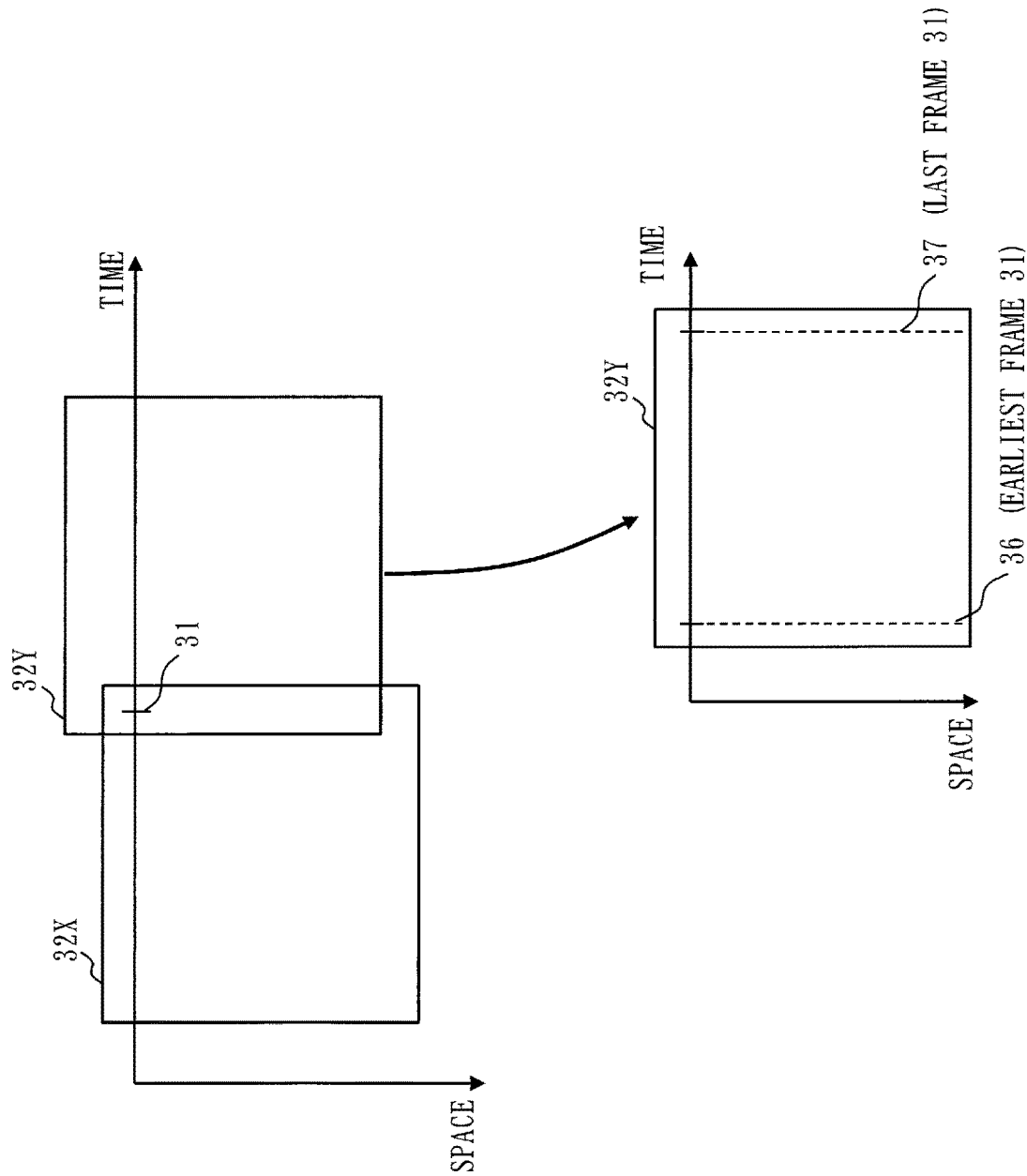
FIG. 13 is a diagram describing time-window frames 32 according to the sixth variation.

Assume that only one frame 31 is overlappingly included in adjacent time-window frames 32, as illustrated in FIG. 13. In this case, the integration unit 23 treats the earliest frame 31, which is overlappingly included in the preceding time-window frame 32, in the target time-window frame 32 as the base frame 36, and treats the last frame 31 in the target time-window frame 32 as the specified frame 37. The integration unit 23 adopts correspondences in the base frame 36 through the specified frame 37 in the target time-window frame 32 as correspondences in the base frame 36 through the specified frame 37 in the integration result 35.

As described above, by decreasing the number of frames 31 to be overlappingly included in adjacent time-window frames 32, the tracking results 34 can be integrated with a smaller amount of calculation.

Figure 14:
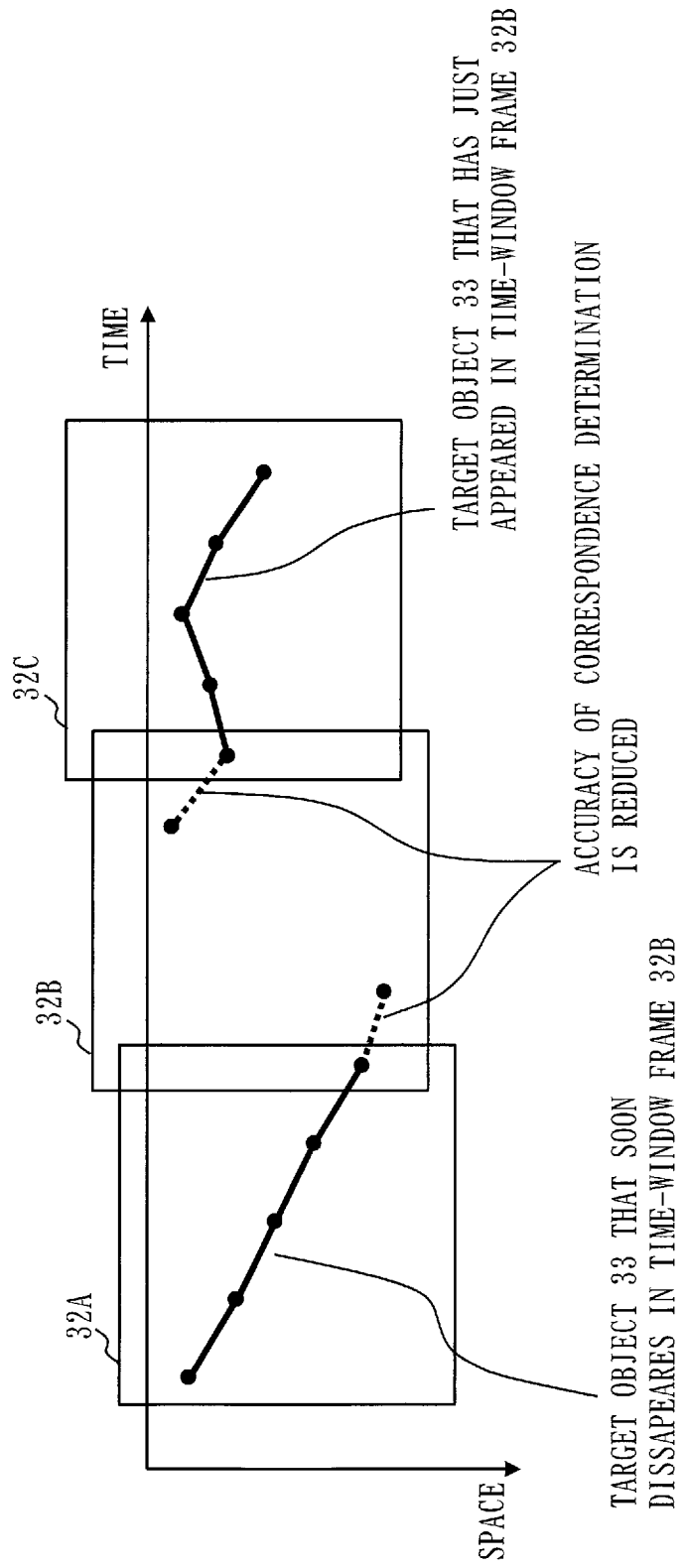
FIG. 14 is a diagram describing a case where tracking accuracy is reduced according to the sixth variation.

However, decreasing the number of frames 31 to be overlappingly included in adjacent time-window frames 32 may reduce the tracking accuracy. For example, as illustrated in FIG. 14, a target object 33 that has just appeared in the video data 30 and a target object 33 that soon disappears from the video data 30 in a frame 31 included in a given time-window frame 32 may not be able to be tracked accurately. This is because these target objects 33 are detected in few frames 31 in the time-window frame 32, and this increases the probability of correspondences not being indicated correctly for these target objects 33 in the process of step S2 of FIG. 2.

REFERENCE SIGNS LIST

10: tracking apparatus, 11: processor, 12: memory, 13: storage, 14: communication interface, 15: electronic circuit, 21: extraction unit, 22: tracking unit, 23: integration unit, 30: video data, 31: frame, 32: time-window frame, 33: target object, 34: tracking result, 35: integration result, 36: base frame, 37: specified frame, 141: camera device, 142: display device

The invention claimed is:

1. A tracking apparatus comprising:
processing circuitry to:
treat two or more consecutive frames of a plurality of frames constituting video data as a time-window frame, and extract a plurality of time-window frames from the video data so as to cause at least one frame to be overlappingly included in adjacent time-window frames;

treat each of the extracted time-window frames as a target time-window frame, and track target objects in the target time-window frame to generate a tracking result; and integrate tracking results generated in individual ones of the time-window frames, based on a frame overlappingly included in more than one time-window frame, to generate an integration result, wherein the processing circuitry extracts the plurality of time-window frames so as to cause two or more consecutive frames to be overlappingly included in two or more consecutive time-window frames, generates the tracking result indicating a correspondence, between frames constituting the target time-window frame, of target objects detected in the frames constituting the target time-window frame, and integrates the tracking results by counting the number of times a same correspondence is indicated by the tracking results between each pair of frames included in the plurality of frames, and determining a correspondence of the target objects between each pair of frames based on the counted number.

2. The tracking apparatus according to claim 1, wherein the processing circuitry treats the number of times the same correspondence is indicated by the tracking results as the number of votes, and determines a correspondence of the target objects between each pair of frames included in the plurality of frames by preferentially adopting a correspondence with the largest number of votes.

3. The tracking apparatus according to claim 1, wherein the processing circuitry treats the number of times the same correspondence is indicated by the tracking results as the number of votes, and determines a correspondence of the target objects between each pair of frames included in the plurality of frames by preferentially adopting a correspondence with a share of votes that is largest, the share of votes being obtained by dividing the number of votes by the number of times the correspondence concerned has a possibility of being selected.

4. The tracking apparatus according to claim 1, wherein the processing circuitry extracts the time-window frames each including a base number of consecutive frames, each of the time-window frames being successively shifted by one frame.

5. The tracking apparatus according to claim 2, wherein the processing circuitry extracts the time-window frames each including a base number of consecutive frames, each of the time-window frames being successively shifted by one frame.

6. The tracking apparatus according to claim 3, wherein the processing circuitry extracts the time-window frames each including a base number of consecutive frames, each of the time-window frames being successively shifted by one frame.

* * * * *